United States Patent
Liu et al.

(10) Patent No.: US 8,000,896 B2
(45) Date of Patent: Aug. 16, 2011

(54) SCALE FACTOR CALIBRATION AND COMPENSATION FOR ANGULAR POSITION RESOLVER

(75) Inventors: Ketao Liu, Cerritos, CA (US); Yeong-Wei A. Wu, Rancho Palos Verdes, CA (US); Jeffrey L. Lee, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 128 days.

(21) Appl. No.: 12/019,513

(22) Filed: Jan. 24, 2008

(65) Prior Publication Data
US 2008/0129242 A1    Jun. 5, 2008

Related U.S. Application Data

(62) Division of application No. 10/965,441, filed on Oct. 13, 2004, now Pat. No. 7,561,968.

(51) Int. Cl.
*G01C 21/00* (2006.01)
(52) U.S. Cl. ........ 701/222; 701/200; 701/207; 701/223; 701/226
(58) Field of Classification Search .................. 701/200, 701/207, 222, 226, 217, 300, 301, 225; 342/359, 342/356; 318/605, 661, 632, 779; 341/112, 341/116, 117; 375/295, 296; 244/171; 708/441, 708/809; 285/265; 33/397; 360/245, 245.3, 360/246.4; 440/57; 73/504.09; 74/5.2
See application file for complete search history.

(56) References Cited

U.S. PATENT DOCUMENTS

| | | | | | |
|---|---|---|---|---|---|
| 3,510,737 | A | * | 5/1970 | Brown et al. | 318/566 |
| 3,662,242 | A | * | 5/1972 | Wacker et al. | 318/573 |
| 3,691,361 | A | * | 9/1972 | Perkins | 701/207 |
| 4,070,674 | A | * | 1/1978 | Buell et al. | 342/117 |
| 4,093,903 | A | * | 6/1978 | Thomas | 318/584 |
| 4,270,077 | A | * | 5/1981 | Swartz et al. | 318/661 |
| 4,551,708 | A | * | 11/1985 | Welburn | 341/116 |
| 4,594,540 | A | * | 6/1986 | Currie et al. | 318/661 |
| 4,631,510 | A | * | 12/1986 | Nagarkatti et al. | 336/135 |
| 4,843,291 | A | * | 6/1989 | Predina | 318/605 |
| 4,890,047 | A | * | 12/1989 | Maney | 318/661 |
| 4,922,175 | A | * | 5/1990 | Sugiura et al. | 318/592 |
| 4,933,674 | A | * | 6/1990 | Gasperi et al. | 341/116 |
| 4,989,001 | A | * | 1/1991 | Serev | 341/116 |
| 5,134,397 | A | * | 7/1992 | Eyerly et al. | 341/116 |
| 5,155,696 | A | * | 10/1992 | Shibata et al. | 700/302 |
| 5,189,353 | A | * | 2/1993 | Ezuka | 318/605 |
| 5,241,268 | A | * | 8/1993 | Lee | 324/207.25 |
| 5,250,889 | A | * | 10/1993 | Ezuka | 318/661 |
| 5,517,204 | A | * | 5/1996 | Murakoshi et al. | 343/765 |
| 5,521,494 | A | * | 5/1996 | Hore et al. | 324/207.16 |
| 5,646,495 | A | * | 7/1997 | Toyozawa et al. | 318/625 |

(Continued)

FOREIGN PATENT DOCUMENTS
JP       410185679 A    7/1998

*Primary Examiner* — Khoi Tran
*Assistant Examiner* — Jorge Peche
(74) *Attorney, Agent, or Firm* — Haynes & Boone, LLP.

(57) ABSTRACT

In accordance with an embodiment of the present invention, a resolver system has at least one resolver and at least one amplifier in electrical communication with each resolver. A reference circuit is in electrical communication with the amplifiers. The reference circuit provides reference signals to the amplifiers. A non-linearity calibration and compensation circuit in communication with each amplifier uses the amplified reference signals to provide scale factors, so as to enhance a precision of the resolver system.

18 Claims, 2 Drawing Sheets

U.S. PATENT DOCUMENTS

| | | | |
|---|---|---|---|
| 5,646,496 A * | 7/1997 | Woodland et al. | 318/632 |
| 5,763,976 A * | 6/1998 | Huard | 310/168 |
| 5,912,638 A * | 6/1999 | Vlahu | 341/116 |
| 5,949,359 A * | 9/1999 | Vlahu | 341/116 |
| 6,084,376 A * | 7/2000 | Piedl et al. | 318/605 |
| 6,198,452 B1 * | 3/2001 | Beheler et al. | 343/757 |
| 6,255,794 B1 * | 7/2001 | Staebler | 318/605 |
| 6,389,373 B1 * | 5/2002 | Ohya | 702/189 |
| 6,433,736 B1 * | 8/2002 | Timothy et al. | 342/359 |
| 6,470,270 B1 * | 10/2002 | Needelman et al. | 701/222 |
| 6,512,979 B1 | 1/2003 | Needelman et al. | |
| 6,525,502 B1 * | 2/2003 | Piedl et al. | 318/605 |
| 6,529,161 B2 * | 3/2003 | Fukushima et al. | 342/359 |
| 6,553,835 B1 * | 4/2003 | Hobbs et al. | 73/514.16 |
| 6,742,604 B2 * | 6/2004 | Brazil et al. | 175/45 |
| 6,931,918 B2 * | 8/2005 | Herb | 73/114.26 |
| 7,093,370 B2 * | 8/2006 | Hansberry et al. | 33/313 |
| 7,362,070 B2 * | 4/2008 | Games et al. | 318/605 |
| 2003/0183423 A1 * | 10/2003 | Brazil et al. | 175/61 |
| 2004/0085039 A1 * | 5/2004 | Games et al. | 318/650 |
| 2005/0218971 A1 * | 10/2005 | Elfman | 327/550 |
| 2006/0071134 A1 * | 4/2006 | Dent et al. | 248/274.1 |

* cited by examiner

SCALE FACTOR CALIBRATION AND COMPENSATION FOR ANGULAR POSITION RESOLVER

RELATED APPLICATIONS

This application is a Divisional of U.S. patent application Ser. No. 10/965,441, filed Oct. 13, 2004 now U.S. Pat. No. 7,561,968, the entire disclosure of which is incorporated herein by reference.

STATEMENT REGARDING FEDERALLY SPONSORED RESEARCH OR DEVELOPMENT

This invention was made with Government support. The Government has certain rights in this invention.

TECHNICAL FIELD

The present invention relates generally to electrical position sensors. It relates more particularly to the use of real-time, non-linear scale factors such as, for example, for the compensation of temperature dependent errors in angular position sensor systems, such as those using resolvers.

BACKGROUND

Angular position sensors, such as resolvers, are well known. A resolver is a position sensor that measures the angle or amount of rotation of a shaft. When calibrated properly, resolvers are capable of great precision.

Resolvers are used in such applications as determining the angular orientation of gimbaled devices. Examples of gimbaled devices include antennae and optical instruments. Line-of-sight antennae, such as those used in microwave and laser communications, require precise positioning. Optical instruments, such as telescopes and cameras, also require precise positioning.

Resolvers are frequently used in spacecraft to facilitate the pointing of antennae, optical instruments and the like at distant objects. Such space-based applications of resolvers present particular challenges, since according to contemporary methodology the ability to perform resolver system calibration after launch is limited or non-existent.

To point or position a gimbaled device, a computer typically sends a drive signal to a positioning motor that effects the desired movement of the gimbaled device. A resolver provides a position signal for the device, so that the difference between the device's actual position and its desired position can be determined. This difference is used according to well known principles to effect further movement of the device toward the desired position. Thus, resolvers are often important parts of position feedback loops that control the pointing of gimbaled devices.

Resolvers provide a sine signal and a cosine signal that, taken together, are indicative of the angle to which a shaft has been rotated. The sine signal comes from one winding, i.e., the sine winding, of the resolver and the cosine signal comes from another winding, i.e., the cosine winding, of the resolver.

The sine and cosine windings define two secondary windings of a transformer. They are typically part of a stator of the resolver, while a single primary winding is typically part of a rotor of the resolver.

The position of the rotor determines the amount of coupling of the primary winding with the two secondary windings. The coupling, and consequently the amplitude of the coupled signal, is therefore indicative of the position of the rotor.

The two secondary windings are oriented at approximately 90° with respect to one another. Thus, when one secondary winding has maximum coupling with respect to the primary winding, the other secondary winding has minimum coupling with respect thereto.

As the rotor turns, one of the two secondary windings produces a signal that can be considered a sine signal, while the other secondary winding produces a signal that can be considered a cosine signal since the two signals are 90° out of phase with respect to one another. Since the tangent of an angle is equal to the sine of the angle divided by the cosine of the angle, an arctangent function can be used to determine the angle of the shaft from the sine and cosine signals.

The outputs of the sine and cosine windings may be amplified and then digitized to provide digital angular position information for use by a digital processor. However, the precision of such contemporary resolver systems is undesirably limited by errors, such as those introduced by the use of multiple pole windings and by non-linearities of the resolver amplifiers.

Multiple pole windings are commonly used in contemporary resolvers. That is, instead of a single large sine winding and a single large cosine winding, a plurality of smaller sine and cosine windings, distributed about the rotor, are generally provided.

The positioning of the multiple sine and cosine windings with respect to one another must be exact in order to achieve perfect sine and cosine signals. However, due to inherent manufacturing tolerances, this positioning is never exact and undesirable errors are introduced. These multi-winding errors tend to reduce the precision of the resolver by introducing deviations in the sine and cosine outputs of the secondary windings.

Amplifiers, including the amplifiers of resolver positioning systems, are inherently non-linear to some degree. Of course, such non-linearity adversely affects the precision of a positioning system that uses the outputs of such amplifiers.

Contemporary methods of calibrating space-based resolver systems include both ground calibration procedures and mission operation calibration procedures. Ground calibration procedures are performed on the Earth, prior to launch. For example, a lookup table may be formed wherein error compensation or scale factors are provided for a plurality of different resolver system outputs. Thus, when a particular resolver system output is provided during mission operations, the appropriate scale factor can be applied to the resolver system output. Scale factors can be interpolated, when necessary.

Mission operation calibration procedures are performed in space, typically during the spacecraft's mission. For example, the gimbaled device can be moved to known positions, such as against gimbal stops, and then the scale factor lookup table can be updated.

However, such contemporary methods of calibrating space based resolver systems suffer from inherent drawbacks that substantially reduce their effectiveness and/or desirability. For example, ground procedures do not maintain the desired pointing precision over the life of the mission because resolver system errors tend to vary over time, due to such factors as temperature and mechanical wear.

Mission operation calibration procedures typically require undesirable mission interruptions in order to provide the necessary calibration data. Further, mission operation procedures are generally limited in their ability to provide adequate calibration data. For example, the number of known gimbaled device positions available for space based calibration is limited (typically, to those positions wherein the gimbals are against their stops).

As gimbaled devices such as antennae and optical instruments are used over greater and greater distances, the pointing precision required by their positioning systems substantially increases. As mission lifetimes increase in duration, the need to maintain such precision for longer periods of time increases.

As a result, there is a need for methods and systems to reduce the undesirable effects of errors in contemporary resolver systems and thereby enhance the utility of gimbaled devices and the like that rely upon such resolver systems for positioning.

SUMMARY

Systems and methods are disclosed herein to provide for the calibration of resolver positioning systems, so as to facilitate compensation for non-linearity errors and thus enhance the precision with which gimbaled devices can be positioned. For example, in accordance with an embodiment of the present invention, a plurality of known reference signals are input to resolver amplifiers and the resulting amplifier outputs are used to determine scale factors that mitigate the effects of non-linearity errors.

More specifically, in accordance with one embodiment of the present invention, a plurality of reference voltages are input in real-time, i.e., during normal system operation, into the sine and cosine amplifiers of a resolver system. The outputs of the amplifiers are measured for each reference signal. By processing the measured outputs of the resolver amplifiers for each of the known inputs, a set of coefficients are determined so as to characterize the non-linearity of the resolver amplifiers. These coefficients are subsequently used to facilitate the determination of non-linearity correction or scale factors that are applied to the resolver positioning system to compensate for non-linearities and thus enhance the precision thereof.

In accordance with another embodiment of the present invention, a plurality of reference positions of gimbals are used to determine non-linearities of the resolver positioning system, including non-linearities of the gimbals themselves. For example, a plurality of electrical contacts can be used to determine the reference positions of the gimbals. Moving the gimbals to their reference positions facilitates compensation of end-to-end (including the gimbals, the resolvers, the amplifiers, and associated electronics) non-linearity of a gimbaled device positioning system.

In accordance with one or more embodiments of the present invention, the desired pointing precision of a gimbaled device is enhanced over the life of a mission. Precision is enhanced because the resolver system errors that tend to vary over time, due to such factors as temperature and mechanical wear, are substantially mitigated.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
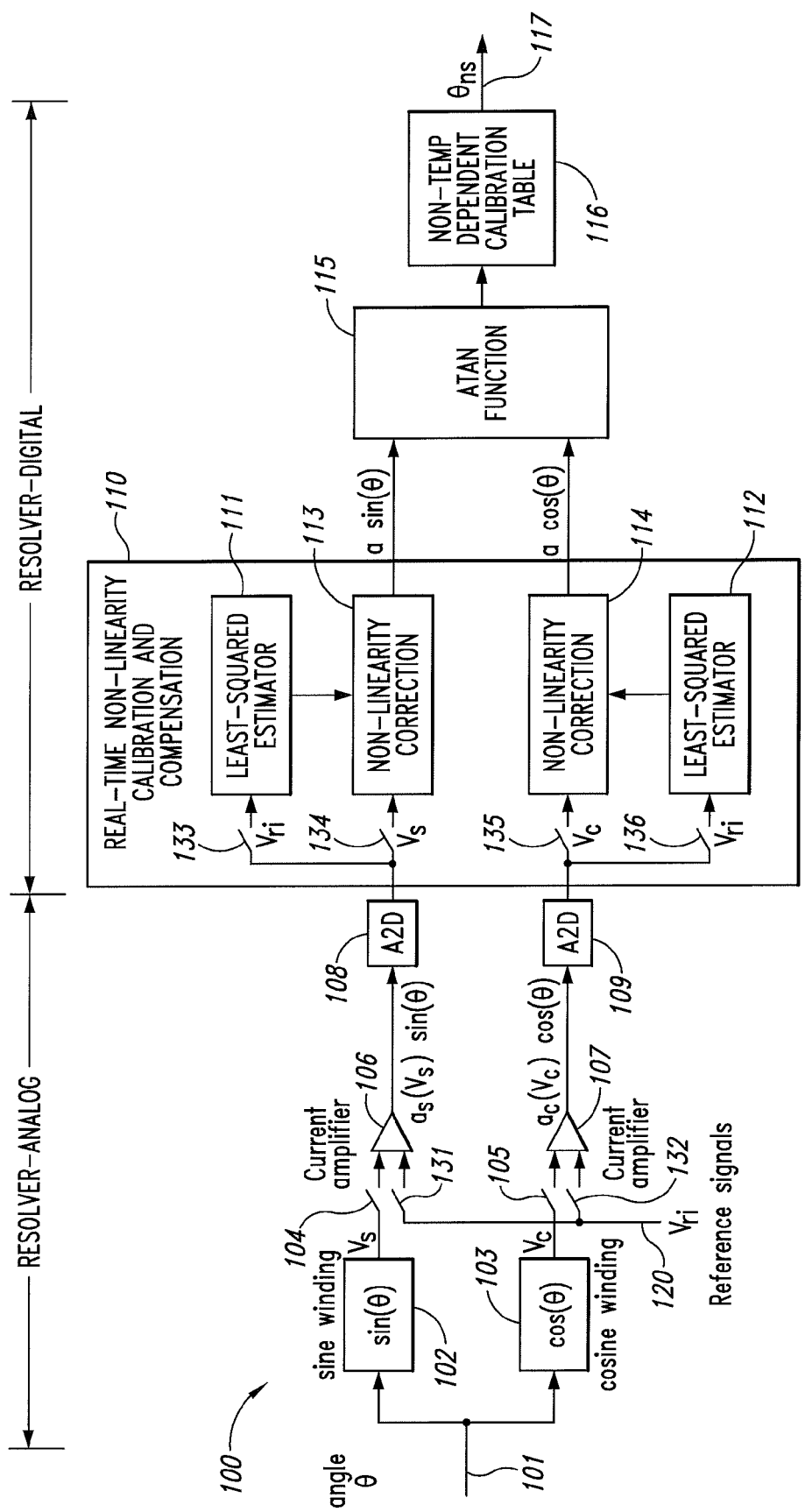
FIG. 1 shows a block diagram illustrating an angular position resolver system having real-time scale factor calibration and compensation in accordance with an exemplary embodiment of the present invention.

Methodologies and systems are disclosed in accordance with embodiments of the present invention for determining or calibrating the non-linearity of position sensor electronics and/or substantially complete position sensor systems (including mechanical components) in real time by providing a plurality of known references. The known references either can be electronic (e.g., voltage signals) or can be mechanical (e.g., physical positions of a gimbal or resolver).

Thus, one or more embodiments of the present invention address two aspects of calibrating resolver positioning systems. According to one aspect, only the processing electronics (such as the resolver amplifiers) are calibrated (the mechanical components of the resolver positioning system are not calibrated). This aspect of calibration is performed using known electronic reference signals.

According to the other aspect, both the processing electronics and the mechanical components of the resolver positioning system are calibrated to enhance end-to-end performance. This aspect of calibration is performed using mechanical references. A combination of both aspects of calibration tends to maintain optimal positioning precision during mission life.

According to one aspect of the present invention, a calibration system processes measured outputs from resolver signal processing electronics, wherein the measured outputs result from using known electronic reference signals as inputs thereto. The reference signals and the measured output signals are used to determine a set of coefficients that characterize the non-linearity of the resolver signal processing electronics. The estimated non-linearity of the resolver signal processing electronics is thus computed and non-linearity corrections or scale factors are subsequently calculated and applied to resolver signals to enhance the precision thereof.

For example, one or more embodiments the present invention can be used to generally continuously calibrate a resolver positioning system's current amplifiers, so as to characterize amplifier non-linearity errors. Thus, compensation for such non-linearity errors can be applied to the resolver positioning system signals in real time, so that temperature dependent and other time varying errors can be substantially removed over the mission life.

According to another aspect of the present invention, electrical contact points or the like are used to define mechanical gimbal reference positions. The resolver processing electronics' output signals are measured at each such reference position and the resolver system signals are processed to estimate the end-to-end non-linearity of the resolver positioning system. In this manner, a set of non-linearity coefficients are again provided. The non-linearity can then be compensated for using scale factors in real time, as determined from the coefficients.

A single ground-based, end-to-end calibration can be used according to contemporary practice to compensate for non-temperature dependent, non-time varying errors prior to employing the methodology of the present invention. Subsequently, real-time calibration and compensation according to the present invention can be used after launch to compensate for temperature dependent and other time varying errors, so that position precision can be maintained over mission life.

Current amplifier calibration can be updated during mission operations by momentarily removing the resolver outputs from the current amplifiers and providing reference voltages to the current amplifier.

End-to-end calibration data can be provided during mission operations each time that a gimbal passes by a known calibration or reference point, as sensed by the electrical contacts. This can be accomplished without interfering with normal gimbaled device operation. Alternatively, the gimbal can be explicitly caused to move to the reference points. In either instance, pointing precision is enhanced without the need for substantial mission interruptions.

As used herein, the terms "real time" (the noun) and "real-time" (the adjective) indicate that a procedure is performed during routine mission processes, without substantial interruption to mission processes. Thus, when a real-time calibration of a resolver positioning system is performed according to the present invention, the positioning of a gimbaled device is not substantially adversely affected.

As shown in FIG. 1, a gimbal or the like defines a measurable physical position parameter, such as a mechanical angle of rotation 101. In this exemplary embodiment of the present invention, a resolver is used to measure the angle of rotation 101. This angle of rotation 101 determines the amount of electrical coupling between the primary winding, which moves with the shaft of the resolver, and sine winding 102 and cosine winding 103 (both secondary windings), which remain stationary with the stator of the resolver.

As those skilled in the art will appreciate, resolvers typically have multiple sine and cosine windings. However, single sine and cosine windings are shown in FIG. 1 and discussed herein for simplicity.

The resolver thus defines a transformer, wherein the amount of coupling between the primary winding and the secondary windings is indicative of the angle being measured. The sine winding and the cosine winding are disposed at 90° with respect to one another, such that a sine and cosine relationship is established between the signals provided thereby. Since the sine of an angle divided by the cosine of the same angle is the tangent of that angle, the angle can be determined by calculating the arctangent (i.e., the output of the sine winding divided by the output of the cosine winding).

The outputs of the sine winding 102 and the cosine winding 103 are amplified by current amplifiers 106 and 107 to facilitate better determination of the amplitudes thereof. Switches 104 and 105 selectively place the sine 102 and cosine 103 windings in electrical communication with their respective current amplifiers 106 and 107. Reference signals 120 are provided to the current amplifiers 106 and 107 to facilitate calibration of the current amplifiers and to facilitate the determination of scale factors. Switches 131 and 132 selectively place the reference signal $V_{ri}$ in electrical communication with their respective current amplifiers 106 and 107.

Analog-to-digital converters 108 and 109 can be used to facilitate determination of the amplitudes of the outputs of the sine winding 102 and cosine winding 103. A real-time, non-linearity calibration and compensation circuit 110 processes the outputs of the analog-to-digital converters 108 and 109. Real-time, non-linearity calibration and compensation circuit 110 can comprise least-squared estimators 111, 112 and non-linearity correction circuits 113, 114, for the sine winding 102 and cosine winding 103, respectively. The least-squared estimators 111, 112 characterize the non-linearity of their associated current amplifier 106, 107 and the non-linearity correction circuits 113, 114 determine the error compensation or scale factors to be applied to the sine and cosine signals, as discussed in detail below.

Switch 133 selectively places analog-to-digital converter 108 in electrical communication with least-squared estimator 111 and switch 136 selectively places analog-to-digital converter 109 in electrical communication with least-squared estimator 112, such as when the reference signals $V_{ri}$ are being applied to the current amplifiers 106 and 107.

Switch 134 selectively places analog-to-digital converter 108 in electrical communication with non-linearity correction circuit 113 and switch 135 selectively places analog-to-digital converter 109 in electrical communication with non-linearity correction circuit 114, such as when the sine winding output $V_s$ and the cosine winding output $V_c$ are being applied to the current amplifiers 106 and 107, respectively.

An arctangent function circuit 115 receives the outputs of the real-time non-linearity calibration and compensation circuit 110 and uses the arctangent function to determine the angle being measured by the resolver. The angle is typically used by a digital controller to effect desired positioning of the gimbaled device.

Typically, a non-temperature dependent calibration table 116 modifies the angle to account for non-temperature related errors in the resolver output that are determined during a one-time, ground based system calibration procedure that may be performed according to contemporary methodology, as mentioned above. The output of the non-temperature dependent calibration table 116 is thus a corrected angle signal 117 that precisely represents the angle 101 of the resolver, and thus also represents the angle of the gimbal.

Thus, this exemplary resolver system comprises both analog circuitry and digital circuitry. The analog circuitry comprises the sine winding 102 and cosine winding 103, the current amplifiers 106 and 107, and the analog-to-digital converters 108 and 109. The digital circuitry comprises the real-time, non-linearity calibration and compensation circuit 110, the arctangent function circuit 115, and the non-temperature dependent calibration table 116.

This embodiment provides a method and system to generally continuously calibrate the non-linearity of the resolver's current amplifiers, and to compensate for non-linearity errors in real time, so that the temperature-dependent and other time varying errors can be removed over the mission life.

Figure 2:
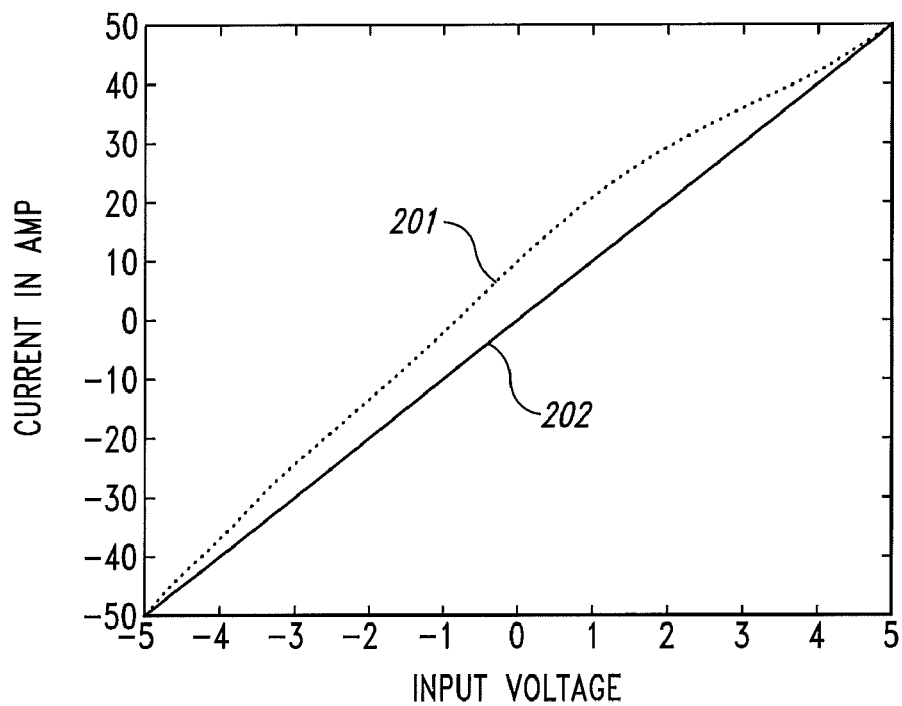
FIG. 2 shows a chart of exemplary non-linear current amplifier output characteristics which may be used to define scale factors according to an embodiment of the present invention.

As shown in FIG. 2, the measured responses (currents) of an exemplary current amplifier 106 or 107 define curve 201 and are substantially non-linear and thus deviate with respect to the ideal linear response 202. The coefficients provided by least-squared estimators 111 and 112 characterize the measured response curve 201. The scale factors provided by this embodiment of the present invention to enhance the precision of the resolver system are representative of the differences between the measured response curve 201 and the ideal linear response 202.

Figure 3:
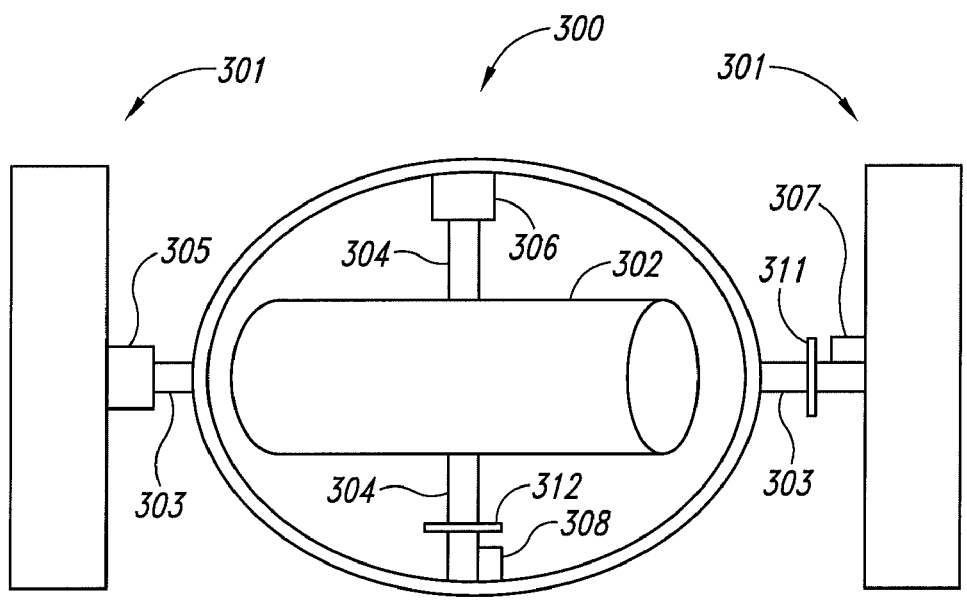
FIG. 3 shows a schematic view of an exemplary gimbaled positioning system, wherein two orthogonal gimbals facilitate positioning of a device in altitude and azimuth according to an embodiment of the present invention.

As shown in FIG. 3, a gimbaled positioning system 300 can be used in a spacecraft 301, according to one aspect of the present invention, to facilitate the precise positioning of a device 302, such as an antenna or camera. First gimbal 303 and second gimbal 304 facilitate positioning of the device 302 in two orthogonal directions, e.g., altitude and azimuth. First drive motor 305 and second drive motor 306 effect desired rotation of the gimbals, so as to position the device 300 during mission operations.

First resolver 307 and second resolver 308 provide precise position feedback, as described herein. First set of gimbal references 311 and second set of gimbal references 312, such as electrical contacts, provide predetermined mechanical gimbal reference positions to facilitate end-to-end resolver positioning system calibration, as described herein.

Referring again to FIG. 1, the operation of the present invention will be discussed in further detail. In operation, a series of known reference signals 120 (labeled $V_{ri}$) can be injected (or multiplexed) into current amplifiers 106 and 107 to facilitate calibration thereof. Switches 104 and 105 can be used to prevent the outputs of the sine winding 102 and cosine winding 103 from also being amplified along with the reference signals.

The outputs from the analog-to-digital converters 108, 109 based on the injected reference signals 120 can be processed in the least-squared estimators 111, 112, which can use a set of basic functions to estimate coefficients that characterize the non-linearity error (which is the difference between curve 201 and ideal linear response 202 of FIG. 2).

These coefficients can then be used by the non-linearity correction circuits 113 and 114 to compute the associated non-linearity error compensation factors to be added to the sine and cosine outputs produced by current amplifiers 106 and 107. In this manner, the undesirable effects of the non-linearities of the current amplifiers 106 and 107 are substantially mitigated.

Non-linearities of the entire resolver system can similarly be compensated for by using mechanical references formed on the gimbals, rather than the reference signals 120. That is, when a gimbal is at known positions, as indicated by electrical contacts 311 and 312 (FIG. 3), then the sine and cosine signals are provided to current amplifiers 106 and 107 and are processed by the real-time linearity calibration and compensation circuit 110 to provide scale factors, as discussed above. In this manner, an end-to-end calibration of the resolver positioning system is facilitated.

With the resolver signals removed (such as by opening switches 104 and 105), the output of the current amplifiers can be measured using a current sensing device, such as via a voltage drop at the input to the analog-to-digital converters 108 and 109. The measured current, $I_m$, as related to a given reference signal, $V_{ri}$, can be expressed as:

$$I_{out} = p_0 V_{ri} + g(p_1, \Lambda, p_N, V_{ri}) + \Delta I_m$$

Once the parameters $p_0$ through $p_N$ have been estimated, then the non-linear current error g(.) can be computed in real time, and used to correct the measured currents $I_{outi}$. Thus, the residual errors due to current amplifier non-linearity can be substantially removed.

Where $p_0$ is the scale factor, g(.) is a non-linear function of parameters $p_1$ through $p_N$ and reference signal $V_{ri}$, then $\Delta I_m$ is the current measurement noise. FIG. 2 shows a typical current to input voltage response where the g(.) is given by:

$$g(p_1, \Lambda, p_N, V_{ri}) = p_1 \cos\left(\frac{2\pi V_{ri}}{20}\right) + p_2 \sin\left(\frac{2\pi V_{ri}}{10}\right) + p_3 \sin\left(\frac{2\pi V_{ri}}{5}\right)$$

This exemplary equation and the exemplary equation that follows use 20, 10, and 5 in the denominators thereof. The actual values will be 360/n, where n is a number speed in the current winding. Only three components (cosine, sine, and sine) are shown here for illustrative purposes. 5 is the first harmonic (1×360/n); 10 is the second harmonic (2×360/n); and 20 is the fourth harmonic (4×360/n). In this instance, n represents a 72 speed current winding.

Given the measured currents, $I_{outi}$, corresponding to each known reference inputs, $V_{ri}$, one can than formulate the following least-squared estimation algorithm to recursively estimate the parameters, $p_0$ through $p_N$. For the example given by the above nonlinear function g(.), the parameters, $p_0$ through $p_3$, can be estimated as follows:

$$\begin{bmatrix} p_0 \\ p_1 \\ p_2 \\ p_3 \end{bmatrix} = (H^T H)^{-1} H^T y$$

$$H = \begin{bmatrix} V_{r1} & \cos\left(\frac{2\pi V_{r1}}{20}\right) & \sin\left(\frac{2\pi V_{r1}}{10}\right) & \sin\left(\frac{2\pi V_{r1}}{5}\right) \\ V_{r2} & \cos\left(\frac{2\pi V_{r2}}{20}\right) & \sin\left(\frac{2\pi V_{r2}}{10}\right) & \sin\left(\frac{2\pi V_{r2}}{5}\right) \\ \vdots & & & \\ V_{rM} & \cos\left(\frac{2\pi V_{rM}}{20}\right) & \sin\left(\frac{2\pi V_{rM}}{10}\right) & \sin\left(\frac{2\pi V_{rM}}{5}\right) \end{bmatrix}$$

$$y = [I_{out1} \; I_{out2} \; \ldots \; I_{outM}]^T$$

As those skilled in the art will appreciate, the present invention may find use in a wide variety of applications, including the positioning or pointing of collectors (such as solar collectors), bus and non-bus portions of a spacecraft with respect to one another, booms (such as those upon which are mounted antennae, radiation sensors, particle sensors/collectors, magnetometers, ion sensors, etc.), lasers, and/or radiation/particle emitters.

Although satellites and spacecraft tend to be substantially different with respect to one another both in construction and function, these terms may be used interchangeably herein because of the many similarities between the systems and devices commonly used thereby.

Although one or more embodiments of the present invention find particular application in space-based applications, the present invention is likewise suitable for use in many terrestrial applications. Thus, applications of the present invention may be ground based (such as upon the Earth, the moon, or another planet) and/or may be space based (such as upon a spacecraft).

One or more embodiments of the present invention may be used in both mobile applications, such as aboard vehicles, and in stationary applications, such as for aiming terrestrial telescopes, antennae, lasers, and the like.

Indeed, one or more embodiments of the present invention may be used in various different types of vehicles, such as automobiles, aircraft, ships, submarines, missiles, rockets, satellites, and spacecraft.

Those skilled in the art will appreciate that the present invention may find applications in the calibration and error compensation of various other position sensing systems. For example, the methodology and/or system of the present may similarly be used to enhance the precision of linear position transducers.

Embodiments described above illustrate but do not limit the invention. It should also be understood that numerous modifications and variations are possible in accordance with the principles of the present invention. Accordingly, the scope of the invention is defined only by the following claims.

We claim:

1. A resolver system comprising:
   at least one resolver including a sine winding and a cosine winding;
   a reference circuit, the reference circuit providing a series of reference signals;
   a first switch operable to select between a winding signal from the sine winding and the series of reference signals to provide a first switch signal;
   a second switch operable to select between a winding signal from the cosine winding and the series of reference signals to provide a second switch signal;
   a first amplifier to amplify the first switch signal;
   a second amplifier to amplify the second switch signal, wherein if the first and second switch select for the series of reference signals, the first and second amplifiers provide a series of amplified reference signals; and
   a non-linearity calibration and compensation circuit configured to use the series of amplified reference signals to provide scale factors to enhance a precision of the resolver system.

2. The resolver system of claim 1, further comprising an analog-to-digital converter in electrical communication with the amplifier(s) for digitizing an output thereof.

3. The resolver system of claim 1, further comprising an analog-to-digital converter in electrical communication with the amplifier(s) for digitizing an output thereof, the analog-to-digital converter(s) providing the amplified reference signals to the non-linearity calibration and compensation circuit.

4. The resolver system of claim 1, wherein the non-linearity calibration and compensation circuit comprises a least-squared estimator and a non-linearity correction circuit that cooperate to modify a signal representative of an output of each winding of the resolver(s) in a manner that reduces position measurement errors.

5. The resolver system of claim 1, further comprising an arctangent function circuit in electrical communication with the non-linearity calibration and compensation circuit for providing an angle corresponding to sine and cosine information from the non-linearity compensation circuit.

6. The resolver system of claim 1, further comprising a non-temperature dependent calibration table in electrical communication with the non-linearity calibration and compensation circuit for modifying an angle to compensate for non-temperature dependent errors.

7. The resolver system of claim 1, wherein the resolver system forms part of a vehicle.

8. The resolver system of claim 1, wherein the resolver system forms part of a vehicle, the vehicle comprising at least one of an automobile, an aircraft, a ship, a submarine, a missile, a rocket, a satellite, and a spacecraft.

9. The resolver system of claim 1, further comprising at least one gimbal and wherein the resolver(s) is/are configured to determine a position of the gimbal(s).

10. The resolver system of claim 9, wherein the gimbal(s) comprise two orthogonal gimbals.

11. The resolver system of claim 9, further comprising a plurality of references formed on at least one of the gimbals to provide reference positions thereof during a calibration procedure.

12. The resolver system of claim 9, further comprising a plurality of electrical contacts formed on at least one of the gimbals to provide reference positions thereof during a calibration procedure.

13. The resolver system of claim 9, further comprising a device formed to the gimbal(s) such that the gimbals) facilitate positioning of the device.

14. The resolver system of claim 13, wherein the device forms part of a vehicle.

15. The resolver system of claim 13, wherein the device forms part of a vehicle, the vehicle comprising at least one of an automobile, an aircraft, a ship, a submarine, a missile, a rocket, a satellite, and a spacecraft.

16. The resolver system of claim 9, further comprising at least one antenna formed to the gimbal(s) such that the gimbal(s) facilitate pointing of the antenna.

17. The resolver system of claim 9, further comprising at least one camera formed to the gimbal(s) such that the gimbal(s) facilitate pointing of the camera.

18. The resolver system of claim 1, further comprising:
    a gimbaled device;
    a gimbaled device positioning system, the gimbaled device positioning system comprising:
    two orthogonal gimbals to which the gimbaled device is mounted such that the gimbaled device can be positioned in two orthogonal directions; and
    wherein the at least one resolver comprises a resolver for each gimbal;
    wherein the at least one amplifier comprises a dedicated amplifier in electrical communication with each resolver;
    wherein the reference circuit provide a plurality of reference signals to the amplifiers;
    wherein the non-linearity calibration and compensation circuit comprises:
    a least squared estimator for estimating coefficients that characterize a non-linearity error; and
    a non-linearity correction circuit for providing a scale factor for a resolver output.

* * * * *